United States Patent
Lee et al.

(10) Patent No.: US 12,191,902 B2
(45) Date of Patent: *Jan. 7, 2025

(54) MOBILE ELECTRONIC DEVICE CASES FOR ELECTROMAGNETIC SHIELDING

(71) Applicant: SPIGEN KOREA CO., LTD., Seoul (KR)

(72) Inventors: Seungjun Lee, Seoul (KR); Seungjoo Kim, Seongnam-si (KR); Sunwoo Yun, Seoul (KR); Jaehong Cho, Seoul (KR); Dae-Young Kim, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,599

(22) Filed: Jul. 10, 2024

(65) Prior Publication Data
US 2024/0364380 A1 Oct. 31, 2024

Related U.S. Application Data

(60) Continuation-in-part of application No. 18/660,932, filed on May 10, 2024, which is a continuation-in-part (Continued)

(51) Int. Cl.
*H04B 1/3883* (2015.01)
*A45C 11/00* (2006.01)
(Continued)

(52) U.S. Cl.
CPC .......... *H04B 1/3888* (2013.01); *A45C 11/00* (2013.01); *A45C 13/1069* (2013.01); *H02J 7/0042* (2013.01); *H02J 50/10* (2016.02); *A45C 2011/002* (2013.01); *A45C 2011/003* (2013.01); *H04B 1/3877* (2013.01)

(58) Field of Classification Search
CPC .. H04B 1/3888; H04B 1/3877; H04B 1/3883; H04B 5/0081; H04B 5/0037; A45C 11/00; A45C 13/1069; A45C 2011/002; A45C 2011/003; H02J 7/0042; H02J 50/10

See application file for complete search history.

(56) References Cited

U.S. PATENT DOCUMENTS 8,188,826 B2 5/2012 Okada et al.
8,746,448 B1 6/2014 Bellace
(Continued)

*Primary Examiner* — Andrew Wendell
(74) *Attorney, Agent, or Firm* — Bridgeway IP Law Group, PLLC; Jihun Kim

(57) ABSTRACT

Devices and products for shielding a mobile electronic device enclosed in a case from an effect of electromagnetic flux generated when a magnetic auxiliary device for the mobile electronic device having a magnet is attached to the case are described. According to one embodiment, the case comprises a protective cover configured to at least partially cover the mobile electronic device and a ferromagnetic plate made of SPCC disposed on the protective cover. In one example embodiment, the at least one ferromagnetic plate is to magnetically couple with the magnet of the magnetic auxiliary device attached to a contact surface of the case, and the at least one ferromagnetic plate is to shield the mobile electronic device from the magnetic flux generated.

20 Claims, 9 Drawing Sheets

Related U.S. Application Data of application No. 18/518,303, filed on Nov. 22, 2023, now Pat. No. 12,081,257, and a continuation-in-part of application No. 18/518,265, filed on Nov. 22, 2023, now Pat. No. 12,052,044, which is a continuation of application No. 17/443,183, filed on Jul. 22, 2021, now Pat. No. 11,863,223, said application No. 18/518,303 is a continuation of application No. 17/443,183, filed on Jul. 22, 2021, now Pat. No. 11,863,223, which is a division of application No. 16/581,596, filed on Sep. 24, 2019, now Pat. No. 11,101,838, which is a continuation of application No. 15/989,033, filed on May 24, 2018, now Pat. No. 10,469,119.

(60) Provisional application No. 63/650,790, filed on May 22, 2024, provisional application No. 62/511,280, filed on May 25, 2017.

(51) Int. Cl.

| | | |
|---|---|---|
| *A45C 13/10* | (2006.01) | |
| *H02J 7/00* | (2006.01) | |
| *H02J 50/10* | (2016.01) | |
| *H04B 1/3888* | (2015.01) | |
| *H04B 5/00* | (2024.01) | |
| *H04B 1/3877* | (2015.01) | |

(56) References Cited

U.S. PATENT DOCUMENTS

| | | | |
|---|---|---|---|
| 9,025,317 | B2 | 5/2015 | Richardson et al. |
| 9,084,343 | B2 | 7/2015 | Waffenschmidt |
| 9,484,769 | B2 | 11/2016 | Kim |
| 9,486,910 | B2 | 11/2016 | Stevens et al. |
| 9,842,688 | B2 | 12/2017 | Kurs et al. |
| 9,935,669 | B1 | 4/2018 | Kuo |
| 10,003,217 | B2 | 6/2018 | Kuerschner et al. |
| 10,097,038 | B2 | 10/2018 | Leem |
| 10,291,058 | B2 | 5/2019 | Kato et al. |
| 10,469,119 | B2 | 11/2019 | Kim |
| 11,101,838 | B2 | 8/2021 | Kim |
| 11,863,223 | B2 | 1/2024 | Kim |
| 2010/0018315 | A1 | 1/2010 | Wang et al. |
| 2011/0050164 | A1 | 3/2011 | Partovi et al. |
| 2011/0148352 | A1 | 6/2011 | Wang et al. |
| 2011/0192857 | A1 | 8/2011 | Rothbaum et al. |
| 2011/0228458 | A1 | 9/2011 | Richardson et al. |
| 2012/0151973 | A1 | 6/2012 | Cheung |
| 2012/0235636 | A1 | 9/2012 | Partovi |
| 2013/0229148 | A1 | 9/2013 | Khan et al. |
| 2013/0300220 | A1 | 11/2013 | Weiss |
| 2014/0062799 | A1 | 3/2014 | Sutherland et al. |
| 2014/0321052 | A1 | 10/2014 | Diebel et al. |
| 2014/0354218 | A1 | 12/2014 | Kaynar et al. |
| 2015/0048752 | A1 | 2/2015 | Van Den Brink et al. |
| 2015/0111621 | A1 | 4/2015 | Smith |
| 2015/0123604 | A1 | 5/2015 | Lee et al. |
| 2015/0214749 | A1 | 7/2015 | Park et al. |
| 2015/0222018 | A1 | 8/2015 | Kumura et al. |
| 2015/0245125 | A1* | 8/2015 | Shaffer ............ H04R 1/02 381/74 |
| 2016/0003270 | A1 | 1/2016 | Franklin |
| 2016/0051019 | A1 | 2/2016 | Sirichai |
| 2016/0056664 | A1 | 2/2016 | Partovi |
| 2016/0119036 | A1 | 4/2016 | Yang et al. |
| 2016/0236626 | A1 | 8/2016 | Yialamas |
| 2016/0241046 | A1 | 8/2016 | Lee et al. |
| 2016/0294427 | A1 | 10/2016 | Wojcik |
| 2016/0318455 | A1 | 11/2016 | Zhang et al. |
| 2016/0352151 | A1 | 12/2016 | Standke et al. |
| 2017/0026498 | A1 | 1/2017 | Goldfain et al. |
| 2017/0035172 | A1 | 2/2017 | Kim |
| 2017/0062999 | A1 | 3/2017 | Thiers |
| 2017/0063128 | A1 | 3/2017 | Van Bosch et al. |
| 2017/0077727 | A1 | 3/2017 | Kim et al. |
| 2017/0098952 | A1 | 4/2017 | Winkler |
| 2017/0098958 | A1 | 4/2017 | Yio et al. |
| 2017/0117085 | A1 | 4/2017 | Mao et al. |
| 2017/0155418 | A1 | 6/2017 | Kim |
| 2017/0170678 | A1 | 6/2017 | Uhm |
| 2017/0264725 | A1 | 9/2017 | Holder |
| 2017/0338676 | A1 | 11/2017 | Yan |
| 2018/0069294 | A1 | 3/2018 | Kang et al. |
| 2018/0109132 | A1 | 4/2018 | Cho et al. |
| 2018/0166905 | A1 | 6/2018 | Park et al. |
| 2018/0343025 | A1 | 11/2018 | Kim |
| 2024/0014580 | A1 | 1/2024 | Schneider |
| 2024/0113740 | A1* | 4/2024 | Kim ............ A45C 13/1069 |

* cited by examiner

MOBILE ELECTRONIC DEVICE CASES FOR ELECTROMAGNETIC SHIELDING

CROSS-REFERENCE TO RELATED APPLICATIONS

This application claims priority to U.S. Provisional Patent Application No. 63/650,790 filed on May 22, 2024 and is a Continuation-In-Part application of and claims priority to U.S. application Ser. No. 18/660,932 filed on May 10, 2024 and entitled "magnetic auxiliary devices for mobile devices", which is a Continuation-In-Part application of U.S. application Ser. No. 18/518,265 and U.S. application Ser. No. 18/518,303 filed on Nov. 22, 2023 and both entitled "magnetic mount for electronic device," which are Continuation applications of and claim priority to U.S. patent application Ser. No. 17/443,183 filed on Jul. 22, 2021 and patented as U.S. Pat. No. 11,863,223 on Jan. 2, 2024, which is a Divisional application of and claims priority to U.S. patent application Ser. No. 16/581,596 filed on Sep. 24, 2019 and patented as U.S. Pat. No. 11,101,838 on Aug. 24, 2021, which is a Continuation application of and claims priority to U.S. patent application Ser. No. 15/989,033 filed on May 24, 2018 and patented as U.S. Pat. No. 10,469,119 on Nov. 5, 2019, which claims priority to U.S. Provisional Patent Application No. 62/511,280, filed on May 25, 2017, the disclosures of which are incorporated herein by reference in their entirety.

FIELD

The present invention relates to a case having a ferromagnetic plate, particularly steel plate cold commercial, for shielding a mobile electronic device enclosed in the case from an effect of electromagnetic flux generated when a magnetic auxiliary device of the mobile electronic device having a magnet is attached to the case.

BACKGROUND

A magnetic material is embedded inside a mobile electronic device, such as a smartphone, and a magnetic auxiliary device capable of magnetic coupling to the magnetic material may be magnetically coupled to the mobile electronic device, where the magnetic auxiliary device may be used for various purposes.

For example, the magnetic auxiliary device may be a storage device with an advantage of holding portable items, such as credit cards, coins, etc., thus providing a storage space which is generally not affordable in the mobile electronic device, while maintaining a magnetically coupled state with the mobile electronic device. The magnetically coupled state may be realized by a magnet installed in the auxiliary device.

In another example, the magnetic auxiliary device may be a magnetic ring which is used to assist the user of the mobile electronic device to get a better handle on the mobile electronic device through preventing the mobile electronic device from slipping and falling and to stay stable. In yet another example, the magnetic auxiliary device may be a magnetic car mount which is configured to be mounted to an air vent of a car so that the mobile electronic device may be magnetically coupled on a base of the magnetic car mount, thus allowing a hands-free experience to the user of the mobile electronic device when driving the car.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure includes multiple embodiments for shielding a mobile electronic device enclosed in a case having a ferromagnetic material from an effect of electromagnetic flux generated when a magnetic auxiliary device of the mobile electronic device having a magnet is directly attached to the case.

According to one embodiment, a case for a mobile electronic device, where the mobile electronic device has a coil for wireless charging and where the coil is disposed in the mobile electronic device and has an inner boundary and an outer boundary, comprises a protective cover configured to at least partially cover the mobile electronic device as well as at least one ferromagnetic plate disposed on the protective cover. In one example embodiment, the at least one ferromagnetic plate is positioned not to substantially block magnetic waves passing through an area formed by the inner boundary of the coil. In another example embodiment, the at least one ferromagnetic plate is positioned not to overlap with an orthographic parallel projection of an area formed by the inner boundary of the coil when the mobile electronic device is at least partially covered by the protective cover. In yet another example embodiment, the at least one ferromagnetic plate is to magnetically couple with a magnet of a magnetic auxiliary device attached to a contact surface of the case. In further yet another example embodiment, the at least one ferromagnetic plate is to shield the mobile electronic device from magnetic flux generated when the magnetic auxiliary device is attached to the contact surface of the case.

According to another embodiment, a case for a mobile electronic device, where the mobile electronic device has a coil for wireless charging and where the coil is disposed in the mobile electronic device and has an inner boundary and an outer boundary, comprises a protective cover configured to at least partially cover the mobile electronic device and a ferromagnetic plate made of SPCC disposed on the protective cover. In one example embodiment, the ferromagnetic plate is positioned not to substantially block magnetic waves passing through an area formed by the inner boundary of the coil. In another example embodiment, the ferromagnetic plate is positioned not to overlap with an orthographic parallel projection of an area formed by the inner boundary of the coil when the mobile electronic device is at least partially covered by the protective cover.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the claims. Furthermore, in the detailed description of the present disclosure, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure embodiments of the present disclosure.

Figure 1:
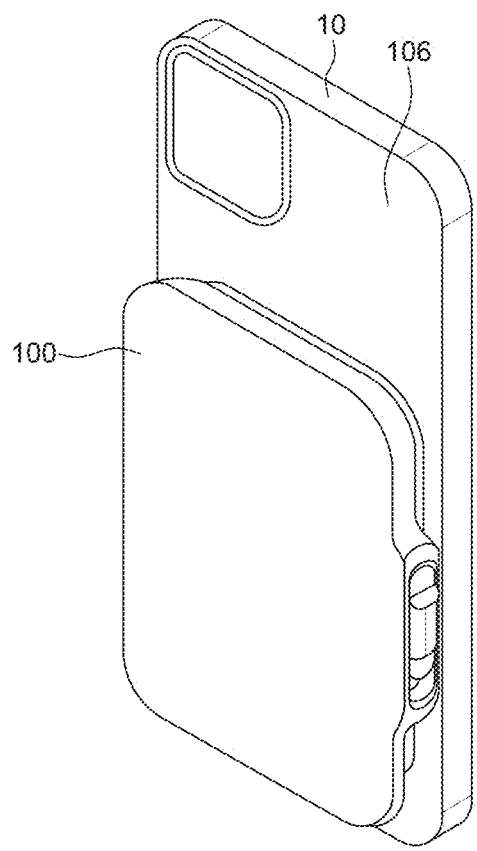
FIG. 1 illustrates a perspective view of a magnetic auxiliary device for mobile electronic device attached on a case enclosing the mobile electronic device.

FIG. 1 illustrates a perspective view of a magnetic auxiliary device 100 for mobile electronic device 10 attached on a case 106 enclosing the mobile electronic device 10. In FIG. 1, the magnetic auxiliary device 100 is a storage device with an advantage of holding portable items, such as credit cards, coins, etc., thus providing a storage space which is generally not affordable in the mobile electronic device 10, while maintaining a magnetically coupled state with the mobile electronic device 10. The magnetically coupled state may be realized by a magnet or a ferromagnetic material installed in the magnetic auxiliary device 100 as well as a magnet or a ferromagnetic material installed in the case 106 enclosing the mobile electronic device 10.

Figure 2A:
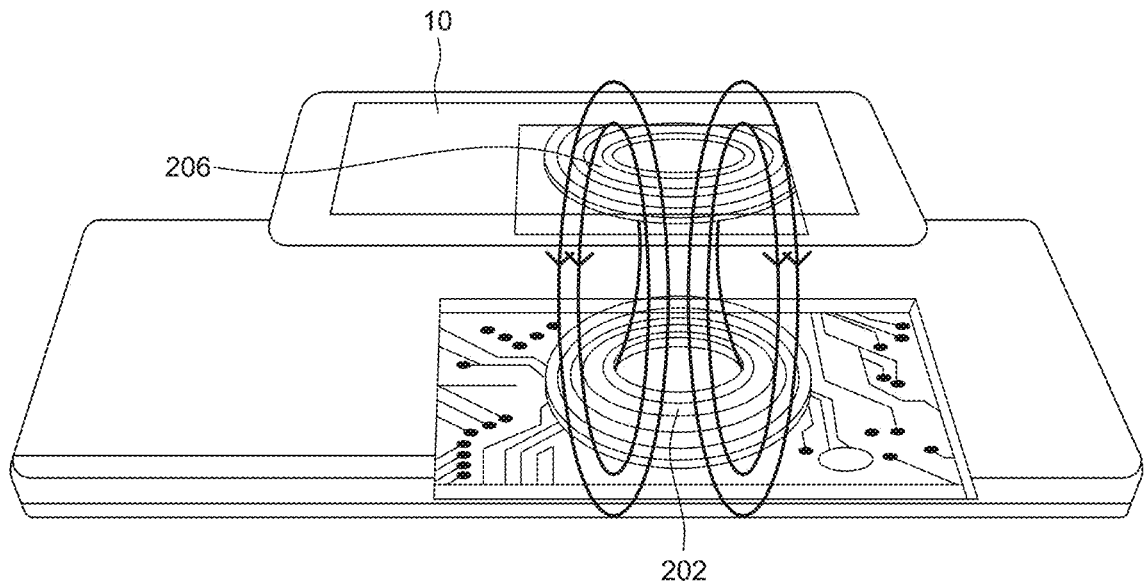
FIG. 2A shows a schematic drawing to illustrate how wireless charging using a transmitter coil and a receiver coil works.
Figure 2B:
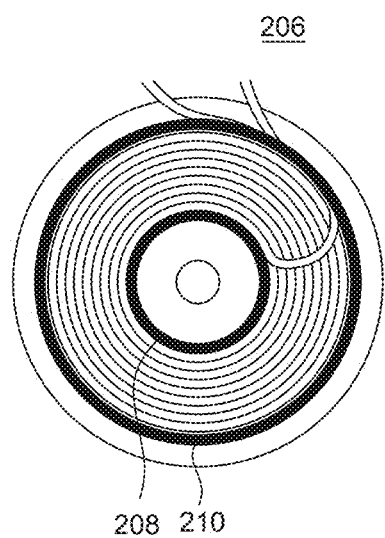
FIGS. 2B and 2C show the receiver circuit or receiver coil of FIG. 2A.
Figure 2C:
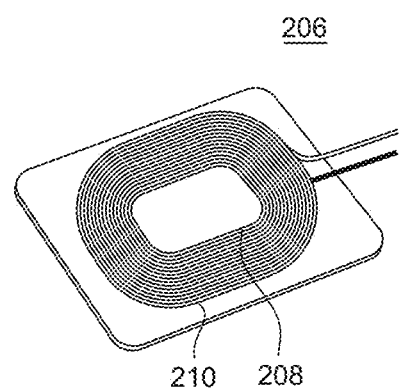

FIG. 2A shows a schematic drawing to illustrate how wireless charging works using a transmitter coil 202 and receiver coil 206 or receiver circuit, and FIGS. 2B and 2C show the receiver coil 206 of FIG. 2A. In FIG. 2A, the transmitter coil 202 in the charging base sends out a signal, where the signal searches for the receiver coil 206 or a receiver circuit, like the one in the mobile electronic device 10 (e.g., a smart phone). When the receiver coil 206 senses the signal, electromagnetic induction begins, where the electrons (electricity) inside the transmitter coil 202 start to flow around in the coil, thus generating a magnetic field, which is sensed by the electrons in the receiver coil 206. The electrons trapped inside the receiver coil 206 start to flow around the coil due to the magnetic field, and this flow of electrons inside the receiver coil 206 is the electricity powering the battery in the mobile electronic device 10.

In FIG. 2B, an inner boundary 208 and an outer boundary 210 of the receiver coil 206 are circular. Alternatively, the inner boundary 208 and the outer boundary 210 of the receiver coil 206 are rectangular with rounded corners as in FIG. 2C.

Figure 3A:
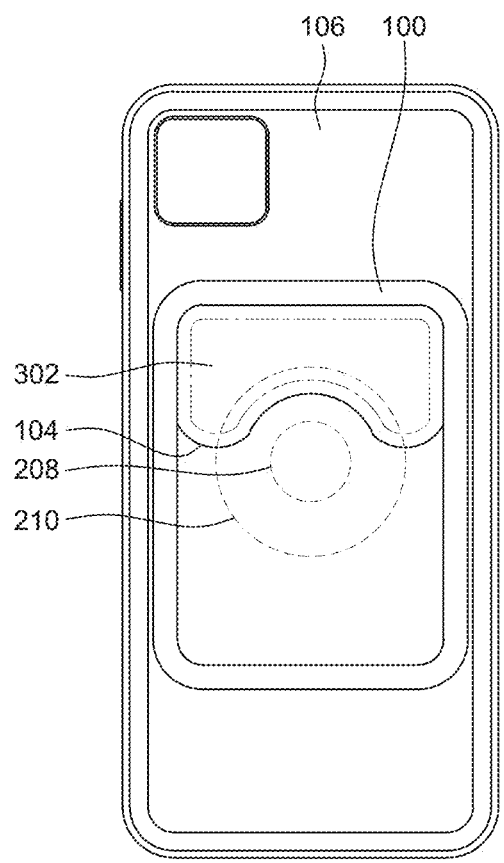
FIGS. 3A and 3B illustrate an overlap of a magnet of the case enclosing the mobile electronic device in FIG. 1 and a magnet of the magnetic auxiliary device in FIG. 1.
Figure 3B:
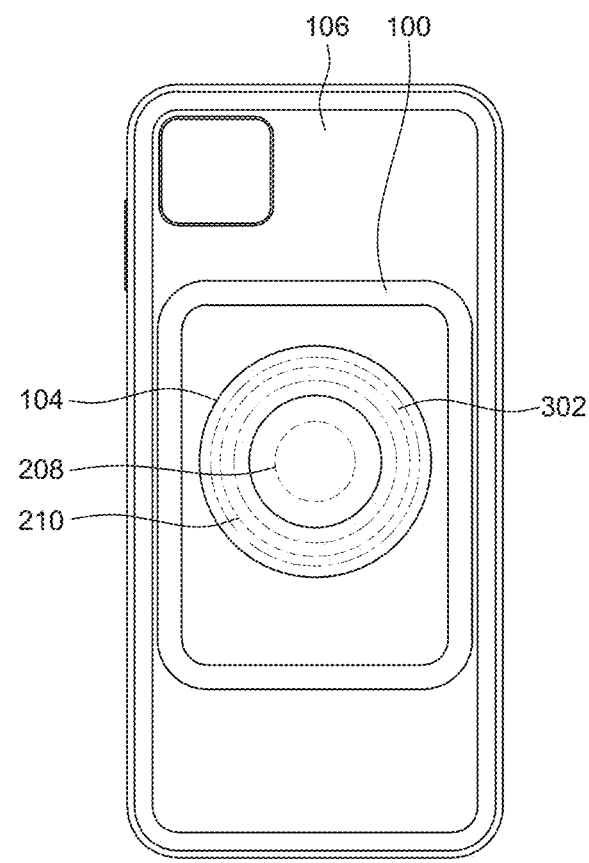

FIGS. 3A and 3B illustrate an overlap of a magnet 302 of the case 106 enclosing the mobile electronic device 10 and a magnet 104 of the magnetic auxiliary device 100 of FIG. 1. In one example embodiment, the magnet 302 is constructed to enable magnetic retention or attachment of the case 106 to the magnetic auxiliary device 100.

As illustrated in FIGS. 3A and 3B, when the mobile electronic device 10 is enclosed in the case 106, the magnet 302, the inner boundary 208 and the outer boundary 210 are substantially symmetrical with respect to the same line. The inner boundary 208 and the outer boundary 210 are generally concentric, and the magnet 302 may or may not be concentric as well. FIGS. 3A and 3B show various relative locations between the magnet 302, the inner boundary 208 and the outer boundary 210.

In one example embodiment, the magnet 302 may be placed in between the inner boundary 208 and the outer boundary 210. Alternatively, the magnet 302 may overlap with the outer boundary 210, or the magnet 302 may be placed outside the outer boundary 210. However, the magnet 302 does not overlap with the inner boundary 208, as illustrated in FIGS. 3A and 3B, so that the magnet 302 does not block the electromagnetic field or substantially impede or prevent wireless charging of the mobile electronic device 10 enclosed in the case 106.

As in FIG. 3A, the magnet 302 is substantially rectangular with one side having a rounded concave edge. In addition, the magnet 302 has rounded corners-preferably, all four corners are rounded. In an alternative embodiment as in FIG. 3B, the magnet 302 is substantially a ring wherein the ring circumscribes the receiver coil 206, where the inner circumference of the ring does not block any of the inner boundary 208 of the receiver coil 206. In one example embodiment, the magnet 302 is attached to the case 106 by an adhesive. Preferably, the adhesive is a double-sided adhesive.

In one example embodiment, as illustrated in FIGS. 3A and 3B, when the magnet 104 is directly coupled with the case 106 of the mobile electronic device 10, the magnet 104 is formed to couple with the magnet 302 formed in the case 106 of the mobile electronic device 10, where the magnet 302 is formed to allow magnetic waves to substantially pass through an area formed by the inner boundary 208 of the receiver coil 206 of the mobile electronic device 10, and where the magnet 302 does not overlap with an orthographic parallel projection of the area formed by the inner boundary 208 of the receiver coil 206.

In one example embodiment, the shape of the magnet 104 is substantially similar to the shape of the magnet 302 so that the maximum magnetic attraction between the case 106 of the mobile electronic device 10 and the magnetic auxiliary device 100 may be realized. As illustrated in FIG. 3A, for example, the shape of the magnet 104 is rectangular with a concave side to match the shape of the magnet 302. In another example, as illustrated in FIG. 3B, the shape of the magnet 104 is a ring to match the shape of the magnet 302.

In each case where the magnetic auxiliary device 100 couples with the case 106 or directly couples with the mobile electronic device 10, the position of the magnet 104 should remain the same. Accordingly, when the magnet 104 is directly coupled with the mobile electronic device 10, the magnet 104 is formed to allow magnetic waves to substantially pass through an area formed by the inner boundary 208 of the receiver coil 206 of the mobile electronic device 10 and the magnet 104 does not overlap with an orthographic parallel projection of the area formed by the inner boundary 208 of the receiver coil 206.

Figure 4:
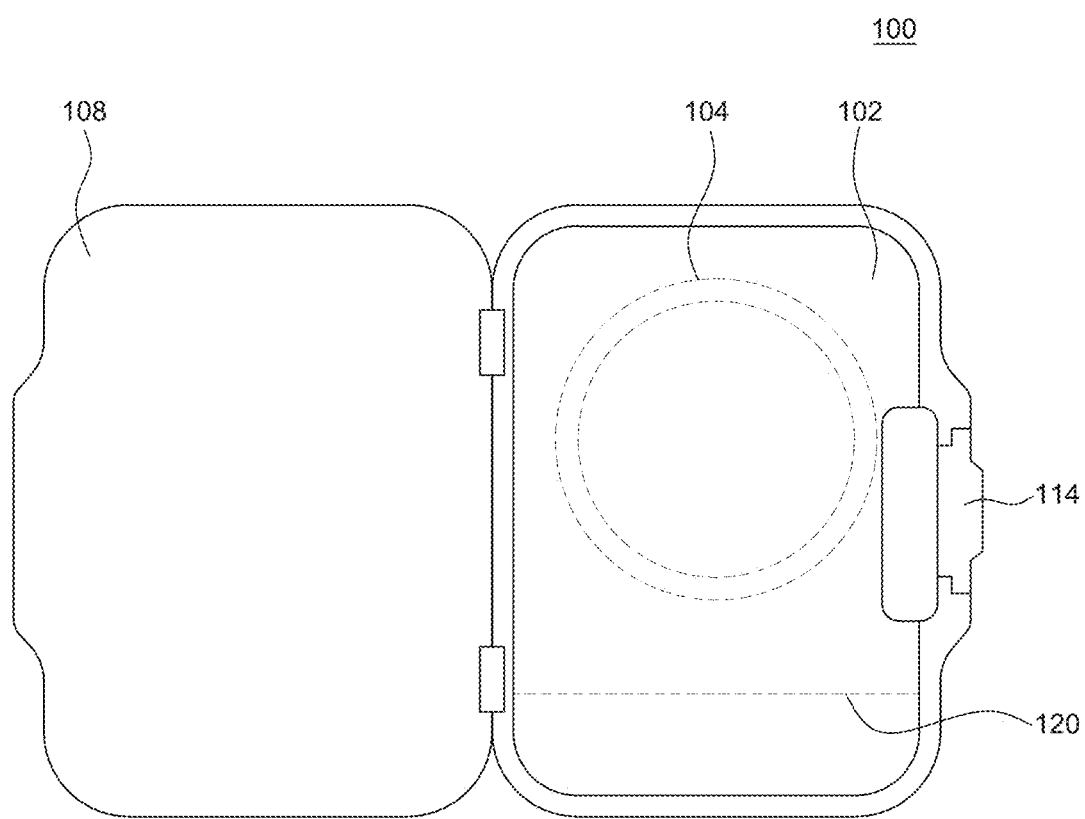
FIG. 4 illustrates a perspective view of the magnetic auxiliary device of FIG. 1.

FIG. 4 illustrates a perspective view of the magnetic auxiliary device 100 of FIG. 1. Particularly, FIG. 4 illustrates a plan view of the magnetic auxiliary device 100 in an open state. As shown in FIG. 4, the magnetic auxiliary device 100 comprises a first case 102 sized to store at least one item, where the first case 102 comprising the magnet 104 formed at a position of the first case 102 to magnetically couple with the mobile electronic device 10 or the case 106 of the mobile electronic device 10. The magnetic auxiliary device 100 also comprises a second case 108 pivotally attached to the first case 102 and pivotable between an open position and a closed position, where the first case 102 is uncovered in the open position and the first case is covered in the closed position.

As shown in FIG. 4, in the magnetic auxiliary device 100, the first case 102 comprises a release mechanism 114 formed on a side of the first case 102. In one example embodiment, the first case 102 further comprises a pocket holder 120 affixed therein to retain at least one card (e.g., credit card). The outer covers (e.g., the first case 102 and the second case 108) are made of polycarbonate, the pocket holder 120 is made of thermoplastic polyurethane (TPU), and the inside of the first case 102 is made of polyurethane (PU) or suede.

Figure 5:
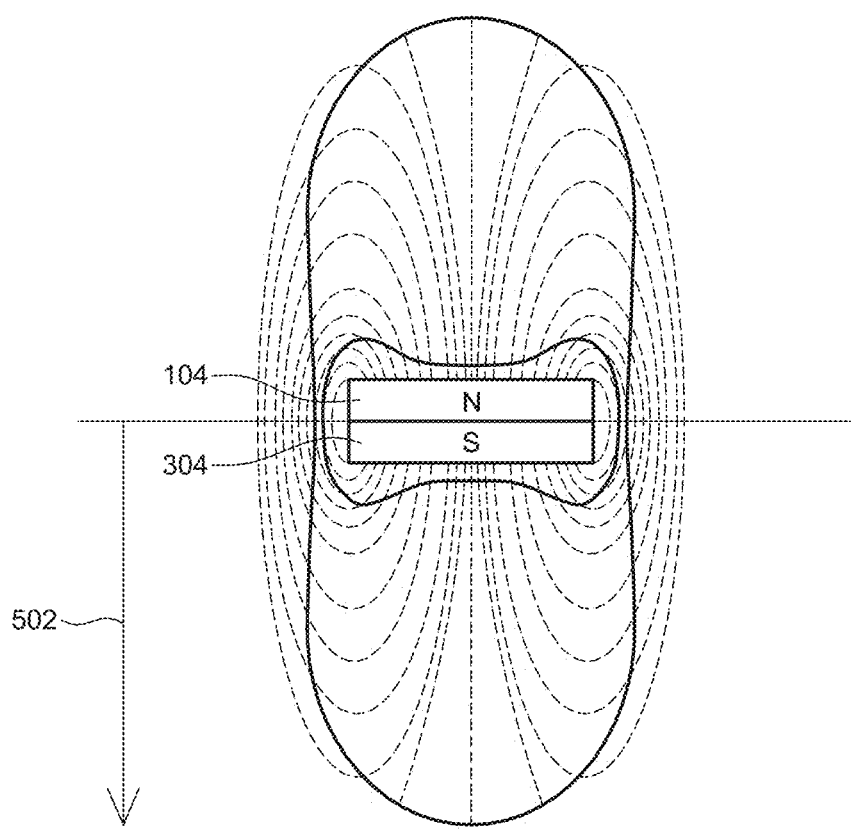
FIG. 5 illustrates magnetic lines of force resulting from the overlap of the magnet of the case enclosing the mobile electronic device and the magnet of the auxiliary device, as illustrated in FIGS. 3A and 3B.

FIG. 5 illustrates magnetic lines of force resulting from the overlap of the magnet 304 of the case enclosing the mobile electronic device and the magnet 104 of the auxiliary device, as illustrated in FIGS. 3A and 3B. As illustrated in FIG. 5, the magnetic lines of force indicate the region in which the force of the magnets 104 and 304 may be detected. This region is called the magnetic field. The magnetic lines of force, or flux, leave the north pole (e.g., the magnet 104) and enter the south pole (e.g., the magnet 304).

As illustrated in FIG. 5, the magnetic field is generated when the magnet 104 is joined with the magnet 304 when the magnetic auxiliary device 100 (e.g., such as a card holder) is joined with the case 106 of the mobile electronic device 10 (e.g., a smart phone). As a consequence, an operation (e.g., a stylus pen operation) of the mobile electronic device 10 may be affected by the magnetic field or flux generated. As illustrated in FIG. 5, the operation of the mobile electronic device 10 placed within an area 502, which is within the magnetic field, may be erred due to the magnetic flux caused by the interworking of the magnet 104 and the magnet 304.

Figure 6A:
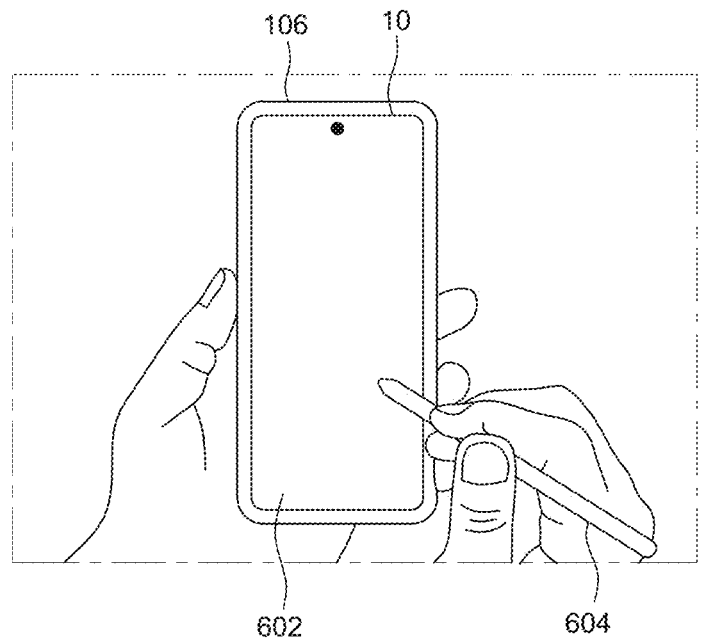
FIG. 6A illustrates a perspective view of writing on a display of a mobile electronic device enclosed in a case using a stylus pen.

FIG. 6A illustrates a perspective view of writing on a display 602 of the mobile electronic device 10 enclosed in the case 106 using a stylus pen 604. Electromagnetic resonance (EMR) technology consists of a layer of sensors that sits behind the device's Liquid Crystal Display (LCD), Light Emitting Diode (LED), Organic Light Emitting Diode (OLED), Quantum dot Light Emitting Diode (QLED) or Active Matrix Organic Light Emitting (AMOLED) screen and a layer of hardened glass. The sensors are arranged in an alternating vertical/horizontal grid pattern. Each sensor may be precisely calibrated and emit a weak electromagnetic signal. Together, these signals create a magnetic field that extends about few milli-meters beyond the glass surface of the device.

Figure 6B:
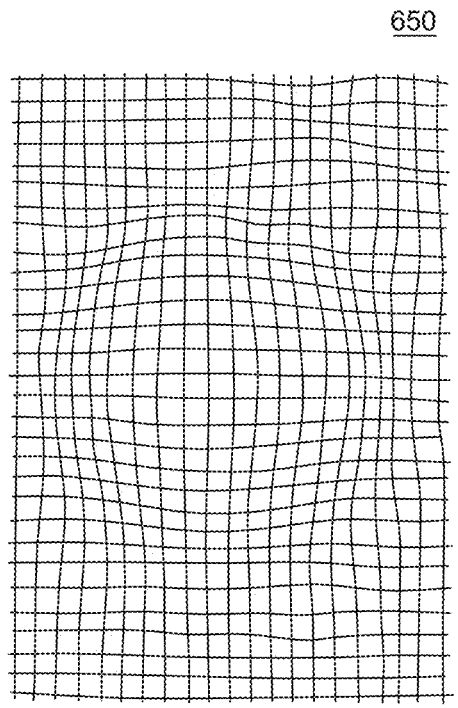
FIG. 6B illustrates a coordinate indicating system of the mobile electronic device with the stylus pen in FIG. 6A distorted by magnetic flux generated when a magnet of a magnetic auxiliary device is attached to a magnet of a case enclosing the mobile electronic device.

FIG. 6B illustrates a coordinate indicating system 650 of the mobile electronic device 10 with the stylus pen 604 of FIG. 6A distorted by the magnetic flux generated when the magnet 104 of the magnetic auxiliary device 100 is attached to the magnet 302 of the case 106 enclosing the mobile electronic device 10.

Although, in the EMR technology illustrated in FIG. 6A, the sensors arranged in the alternating vertical/horizontal grid pattern may be precisely calibrated, but the coordinate indicating system 650 of the mobile electronic device 10 may be distorted as in FIG. 6B because of the electromagnetic flux generated as in FIG. 5 when the magnetic auxiliary device 100 (e.g., a magnetic ring) is attached to the case 106 enclosing the mobile electronic device 10. It is appreciated that although not shown, the magnetic auxiliary device 100 is attached to the case 106 of the mobile electronic device 10 in FIG. 6A. Accordingly, the operation of the stylus pen 604 may not be ideal in FIGS. 6A and 6B.

To deal with this issue, embodiments of the present disclosure propose a case having a magnetic shielding material, such as a ferromagnetic plate, particularly steel plate cold commercial (SPCC), for shielding a mobile electronic device enclosed in the case from the effect of electromagnetic flux generated when an auxiliary device for the mobile electronic device having a magnet is attached to the case.

Figure 7:
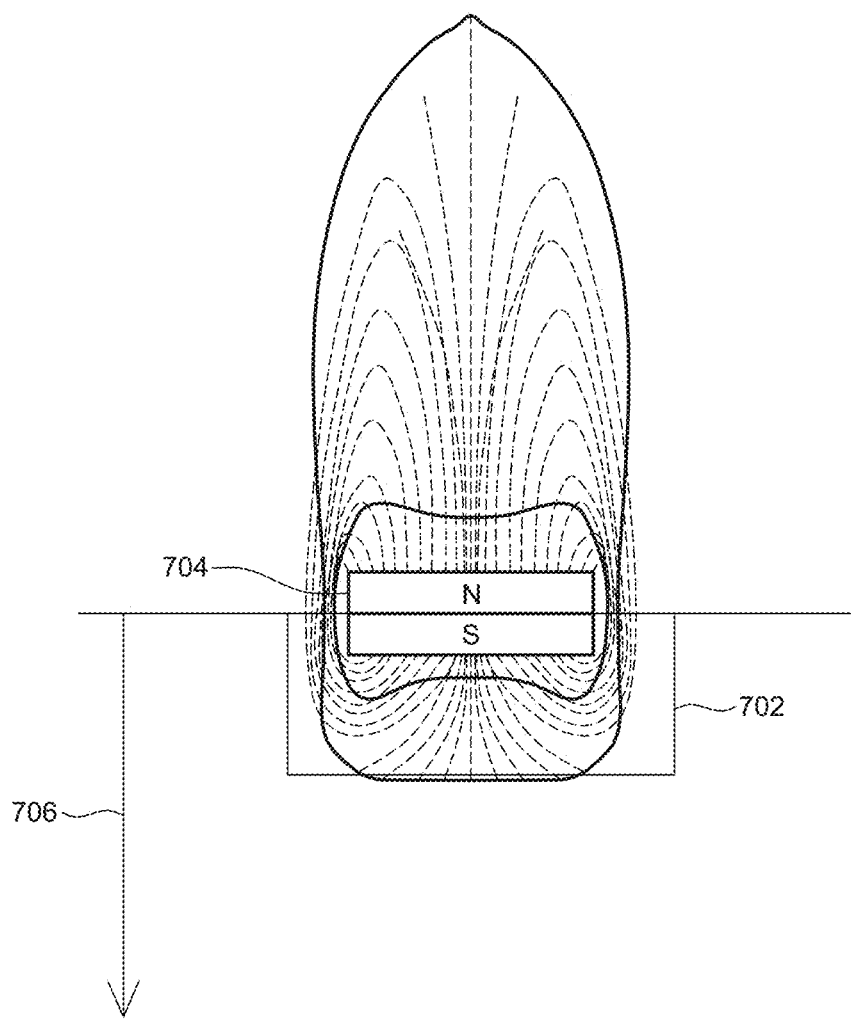
FIG. 7 illustrates magnetic lines of force resulting from magnetically coupling a ferromagnetic plate of a case enclosing a mobile electronic device with a magnet of an auxiliary device, according to one embodiment of the present disclosure.

FIG. 7 illustrates magnetic lines of force resulting from connecting a ferromagnetic plate 702 of a case enclosing a mobile electronic device with an auxiliary device comprising a magnet 704, according to one embodiment of the present disclosure.

As illustrated in FIG. 7, the magnetic lines of force (or magnetic field), which indicate the region in which the force of the magnet 704 can be detected, are curtailed when the magnetic lines of force are blocked, shielded or attenuated by the ferromagnetic plate 702. Thus, the magnetic lines of force, or flux, leaving the magnet 704 appear to be stronger than the magnetic lines of force returning to the magnet 704. In an alternative embodiment, another type of magnetic shielding material may be used instead of the ferromagnetic plate 702.

As illustrated in FIG. 7, the unsymmetrical magnetic field is generated when the magnet 704 is joined with the ferromagnetic plate 702 when the auxiliary device (e.g., such as a magnetic ring) comprising the magnet 704 is attached to the case comprising the ferromagnetic plate 702. In one example embodiment, the ferromagnetic plate 702 is to magnetically couple with the magnet 704 of the auxiliary device while shielding the mobile electronic device from the magnetic flux generated when the auxiliary device is attached to the case.

As a consequence, an operation (e.g., a stylus pen operation) of the mobile electronic device may be shielded from the magnetic field or flux generated. As illustrated in FIG. 7, the operation of the mobile electronic device placed within an area 706 may not be affected by the magnetic flux caused by the interworking of the magnet 704 and the ferromagnetic plate 702 as the ferromagnetic plate 702 is used to shield the mobile electronic device from the magnetic flux generated when the auxiliary device is attached to the case enclosing the mobile electronic device.

Figure 8:
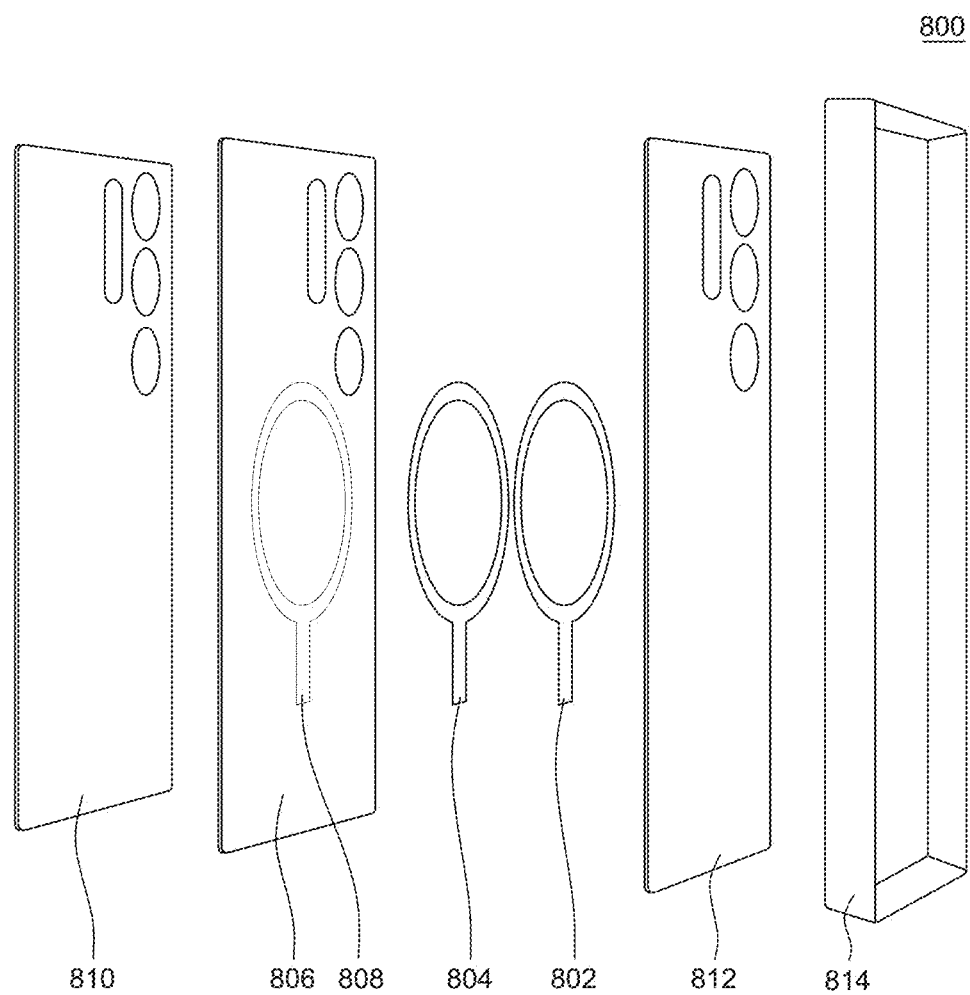
FIG. 8 illustrates a disassembled view of the case of the mobile electronic device in FIG. 7, according to one embodiment of the present disclosure.

FIG. 8 illustrates a disassembled view of a case 800 with a ferromagnetic plate 802, according to one embodiment of the present disclosure. In one example embodiment, the case is configured to enclose a mobile electronic device (e.g., a smart phone) having a coil for wireless charging, where the coil is disposed in the mobile electronic device and has an inner boundary and an outer boundary. It is appreciated that the coil for wireless charging as well as the inner boundary and the outer boundary of the coil share a similar characteristic as the ones illustrated in FIGS. 2A through 2C.

In one embodiment, the case comprises a protective cover 806 configured to at least partially cover the mobile electronic device and at least one ferromagnetic plate 802 disposed on the protective cover 806. In one example embodiment, the at least one ferromagnetic plate 802 is positioned not to substantially block magnetic waves passing through an area formed by the inner boundary of the coil disposed in the mobile electronic device, as illustrated in FIGS. 3A and 3B.

In one example embodiment, the at least one ferromagnetic plate 802 is positioned not to overlap with an orthographic parallel projection of an area formed by the inner boundary of the coil when the mobile electronic device is at least partially covered by the protective cover, as illustrated in FIGS. 3A and 3B. In one example embodiment, the at least one ferromagnetic plate 802 is to magnetically coupled with a magnet of an auxiliary device attached to a contact surface of the case 800. In one example embodiment, the at least one ferromagnetic plate 802 is to shield the mobile electronic device from magnetic flux generated when the auxiliary device is attached to the contact surface of the case, where the best material for magnetic shielding may be any ferromagnetic metal which includes materials that contain iron, nickel, cobalt, and/or any other materials of high magnetic permeability because these materials can easily absorb and redirect magnetic fields.

In one example embodiment, the at least one ferromagnetic plate 802 comprises a steel plate cold commercial (SPCC). In one example embodiment, the case 800 further comprises a magnet (not shown) in a shape of the at least one ferromagnetic plate 802 to couple with the at least one ferromagnetic plate 802. It is appreciated that the addition of the magnet to the ferromagnetic plate 802 may increase the attractive or pull force of the case 800 while maintaining the shield effect of the ferromagnetic plate 802. In one example embodiment, the case 800 is manufactured in such way to maintain a gap between the mobile electronic device and an inner surface of the protective cover 806 to at least 0.3 milli-meter for the effective shielding of the electromagnetic flux generated by the interworking of the case 800 and the auxiliary device.

In one example embodiment, a thickness of the SPCC is at least 0.6 milli-meter to achieve the best shield effect. Further, a size of the SPCC is equal or greater than a size of the magnet of the auxiliary device for the effective shielding of the electromagnetic flux generated by the interworking of the case 800 and the auxiliary device. In one example embodiment, the SPCC is treated with a rust inhibitor (not shown). In one example embodiment, the at least one ferromagnetic plate 802 is attached to the protective cover 806 by an adhesive or a tape 804. In one example embodiment, the at least one ferromagnetic plate 802 is attached to an inner surface of the protective cover 806. In addition, the inner surface of the protective cover 806 has a recess 808 in which the at least one ferromagnetic plate 802 is received. In one example embodiment, the case 800 further comprises a protective frame sheet 810 and a protective frame sheet 812 attached to the at least one ferromagnetic plate 802. In addition, the case 800 comprises a case body 814.

In one example embodiment, the at least one ferromagnetic plate 802 is arranged to form a rounded shape having an inner boundary, where the inner boundary of the rounded shape substantially symmetrically aligns to orthographic parallel projections of the inner boundary and the outer boundary of the coil of the electronic or mobile electronic device enclosed by the case 800. In one example embodiment, the inner boundary of the rounded shape is substantially circular.

In another embodiment, the case 800 comprises the protective cover 806 configured to at least partially cover the mobile electronic device and the ferromagnetic plate 802 made of SPCC disposed on the protective cover 806, where the ferromagnetic plate 802 is positioned not to substantially block magnetic waves passing through an area formed by the inner boundary of the coil of the mobile electronic device enclosed in the case 800 and where the ferromagnetic plate 802 is positioned not to overlap with an orthographic parallel projection of an area formed by the inner boundary of the coil when the mobile electronic device is at least partially covered by the case 800.

In one example embodiment, the ferromagnetic plate 802 is to magnetically couple with a magnet of an auxiliary device directly coupled to a surface of case 800. In one example embodiment, the ferromagnetic plate 802 is to substantially block magnetic flux generated by the magnet of the auxiliary device from passing through the ferromagnetic plate 802. In one example embodiment, a thickness of the SPCC is at least 0.6 milli-meter or 0.6 T and a size of the SPCC is equal to or greater than a size of the magnet of the auxiliary device. In one example embodiment, a gap between the mobile electronic device enclosed in the case 800 and an inner surface of the protective cover 806 of the case 800 is at least 0.3 milli-meter or 0.3T.

Figure 9:
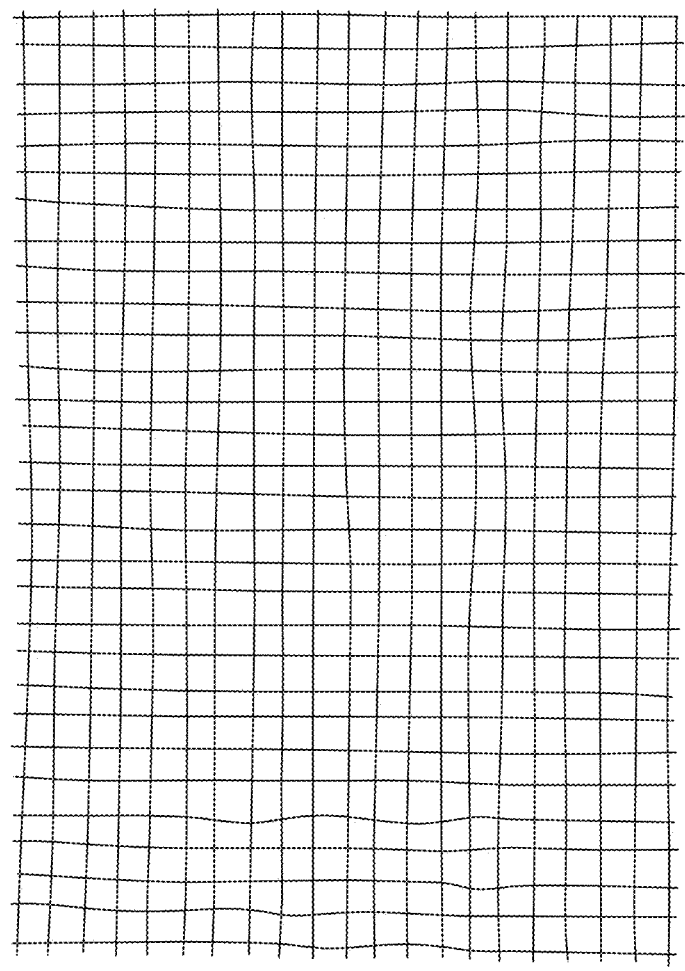
FIG. 9 illustrates a coordinate indicating system of a mobile electronic device with a stylus pen enclosed in the case of FIG. 8, according to one embodiment of the present disclosure.

FIG. 9 illustrates a coordinate indicating system 900 of a mobile electronic device of FIG. 8 with a stylus pen enclosed in the case 800 of FIG. 8 significantly reducing the effect of the magnetic flux generated by the magnet of an auxiliary device magnetically coupled with the case 800, according to one embodiment of the present disclosure.

As illustrated in FIG. 9, the distortion of the coordinate indicating system 650 of the mobile electronic device 10 as illustrated in FIG. 6B may be avoided by shielding the electromagnetic flux generated when the magnetic auxiliary device 100 (e.g., a magnetic ring) is attached to the case 800 enclosing the mobile electronic device 10, as illustrated in FIG. 8. Through enclosing the mobile electronic device with the case 800, the coordinate indicating system 900, which attenuates the distortion caused by the magnetic flux generated by the magnet 704 of the auxiliary device, may be realized.

The present disclosure includes multiple embodiments for reducing the effect of magnetic flux caused by an auxiliary device magnetically coupled to a phone case enclosing a smart phone through proposing the case having a ferromagnetic plate, for example, steel plate cold commercial (SPCC), for shielding the smart phone enclosed in the case from the effect of electromagnetic flux generated when the auxiliary device is attached to the case.

It is to be understood that this disclosure is not limited to particular embodiments or embodiments described, as such may vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided may be different from the actual publication dates which may need to be independently confirmed.

It is noted that, as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order which is logically possible.

Although the foregoing disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the disclosure. It will be appreciated that those skilled in the art will be able to devise various arrangements which, although not explicitly described or shown herein, embody the principles of the disclosure and are included within its spirit and scope. Furthermore, all examples and conditional language recited herein are principally intended to aid the reader in understanding the principles of the disclosure and the concepts contributed by the inventors to furthering the art, and are to be construed as being without limitation to such specifically recited examples and conditions. Moreover, all statements herein reciting principles, embodiments, and embodiments of the disclosure as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary embodiments shown and described herein. Rather, the scope and spirit of present disclosure is embodied by the appended claims.

What is claimed is:

1. A case for a mobile electronic device having a coil for wireless charging, wherein the coil is disposed in the mobile electronic device and has an inner boundary and an outer boundary, the case comprising:
   a protective cover configured to at least partially cover the mobile electronic device; and
   at least one ferromagnetic plate disposed on the protective cover,
   wherein the at least one ferromagnetic plate is positioned not to block magnetic waves passing through an area formed by the inner boundary of the coil,
   wherein the at least one ferromagnetic plate is positioned not to overlap with an orthographic parallel projection of the area formed by the inner boundary of the coil when the mobile electronic device is at least partially covered by the protective cover,
   wherein the at least one ferromagnetic plate is to magnetically couple with a magnet of a magnetic auxiliary device attached to a contact surface of the case; and
   wherein the at least one ferromagnetic plate is to shield the mobile electronic device from magnetic flux generated when the magnetic auxiliary device is attached to the contact surface of the case.

2. The case of claim 1, wherein the at least one ferromagnetic plate comprises a steel plate cold commercial (SPCC).

3. The case of claim 1, further comprising a second magnet in a shape of the at least one ferromagnetic plate to couple with the at least one ferromagnetic plate.

4. The case of claim 1, wherein a gap between the mobile electronic device and an inner surface of the protective cover is at least 0.3 milli-meter.

5. The case of claim 2, wherein a thickness of the SPCC is at least 0.6 milli-meter.

6. The case of claim 2, wherein a size of the SPCC is equal or greater than a size of the magnet of the magnetic auxiliary device.

7. The case of claim 2, wherein the SPCC is treated with a rust inhibitor.

8. The case of claim 1, wherein the at least one ferromagnetic plate is attached to the protective cover by an adhesive or a tape.

9. The case of claim 1, wherein the at least one ferromagnetic plate is attached to an inner surface of the protective cover.

10. The case of claim 9, wherein the inner surface of the protective cover has a recess in which the at least one ferromagnetic plate is received.

11. The case of claim 1, further comprising a protective frame sheet attached to the at least one ferromagnetic plate.

12. The case of claim 1, wherein the at least one ferromagnetic plate is arranged to form a rounded shape having an inner boundary.

13. The case of claim 12, wherein the inner boundary of the rounded shape symmetrically aligns to orthographic parallel projections of the inner boundary and the outer boundary of the coil.

14. The case of claim 13, wherein the inner boundary of the rounded shape is circular.

15. A case for a mobile electronic device having a coil for wireless charging, wherein the coil is disposed in the mobile electronic device and has an inner boundary and an outer boundary, the case comprising:
- a protective cover configured to at least partially cover the mobile electronic device; and
- a ferromagnetic plate made of steel plate cold commercial (SPCC) disposed on the protective cover,
- wherein the ferromagnetic plate is positioned not to block magnetic waves passing through an area formed by the inner boundary of the coil, and
- wherein the ferromagnetic plate is positioned not to overlap with an orthographic parallel projection of the area formed by the inner boundary of the coil when the mobile electronic device is at least partially covered by the protective cover.

16. The case of claim 15, wherein the ferromagnetic plate is to magnetically couple with a magnet of a magnetic auxiliary device attached to a surface of the protective cover.

17. The case of claim 16, wherein the ferromagnetic plate is to block magnetic flux generated by the magnet of the magnetic auxiliary device from passing through the ferromagnetic plate.

18. The case of claim 15, wherein a thickness of the SPCC is at least 0.6 milli-meter.

19. The case of claim 16, wherein a size of the SPCC is equal or greater than a size of the magnet of the magnetic auxiliary device.

20. The case of claim 15, wherein a gap between the mobile electronic device and an inner surface of the protective cover is at least 0.3 milli-meter.

* * * * *